United States Patent [19]

Perloff et al.

[11] Patent Number: 5,018,171

[45] Date of Patent: May 21, 1991

[54] SMOOTHING FILTER

[75] Inventors: Ronald S. Perloff, Poway; Timothy L. Garverick, Cupertino, both of Calif.

[73] Assignee: National Semiconductor Corp., Santa Clara, Calif.

[21] Appl. No.: 391,439

[22] Filed: Aug. 9, 1989

[51] Int. Cl.$^5$ .............................................. H04L 23/00
[52] U.S. Cl. .................................. 375/121; 370/85.5; 370/100.1
[58] Field of Search ......................... 375/106, 121; 370/85.15, 94.3, 85.4, 85.6, 94.1, 85.1, 100.1, 85, 85.5; 340/825.5

[56] References Cited

U.S. PATENT DOCUMENTS

| | | | |
|---|---|---|---|
| 4,058,672 | 11/1977 | Crager et al. | 370/94.1 |
| 4,606,023 | 8/1986 | Dragoo | 370/94.3 |
| 4,612,541 | 9/1986 | Ohnishi | 370/85.15 |
| 4,663,748 | 5/1987 | Karbowiak et al. | 370/85.12 |
| 4,674,086 | 6/1987 | Szczepanek et al. | 370/100.1 |
| 4,696,001 | 9/1987 | Gagliardi et al. | 370/85.1 |
| 4,878,219 | 10/1989 | Kaufman et al. | 370/94.1 |

Primary Examiner—Douglas W. Olms
Assistant Examiner—Stephen Chin
Attorney, Agent, or Firm—Limbach, Limbach & Sutton

[57] ABSTRACT

Preamble smoothing for information character transmissions in a data transmission network is accomplished as follows. First, the smoothing filter identifies the start of a new preamble. If the start of a new preamble is identified and a previously received preamble has been extended, then the preamble is contacted by deleting an IDLE byte or, if the frame received prior to the initial IDLE byte was a frame fragment, then the information character preceding the initial IDLE byte is deleted. Following the contraction of the preamble, a determination is made as to whether next received byte is an IDLE byte. If it is not, then the preamble is extended by inserting an IDLE byte and the smoothing filter begins searching for the start of a new preamble. If it is, then a counter is incremented. If the counter has not yet reached its preset threshold, then the next byte is checked to determine whether it is an IDLE byte. If it is, then the counter is again incremented. This iterative process continues until the counter threshold is reached. At that point, the smoothing filter again begins searching for the start of a new preamble.

22 Claims, 3 Drawing Sheets

SMOOTHING FILTER

BACKGROUND OF THE INVENTION

1. Field of the Invention

The present invention relates to data transmission systems and, in particular, to a method and apparatus for extending or contracting the preamble of an information frame processed by a station in a data transmission network.

2. Discussion of the Prior Art

Asynchronous communication between stations in a data transmission network occurs through the transmission of a series, or "frame", of information characters, with adjacent frames being separated by start-stop code patterns. The use of a unique start code pattern ("start delimiter") and a unique stop code pattern ("end delimiter") allows the receiving station to identify the exact beginning and the exact end of each received frame. In many transmission networks, the start delimiter is preceded by a set of characters, commonly referred to as a "preamble", that is used to establish and maintain clock synchronization between the transmitting station and the receiving station.

A particular type of data transmission network is defined by the Fiber Distributed Data Interface (FDDI) protocol. The FDDI protocol is an American National Standards Institute (ANSI) data transmission standard which applies to a 100 Mbit/sec. token ring network that utilizes an optical fiber transmission medium. The FDDI protocol is intended as a high performance interconnection among computers as well as among computers and their associated mass storage subsystems and other peripheral equipment.

Figure 1:
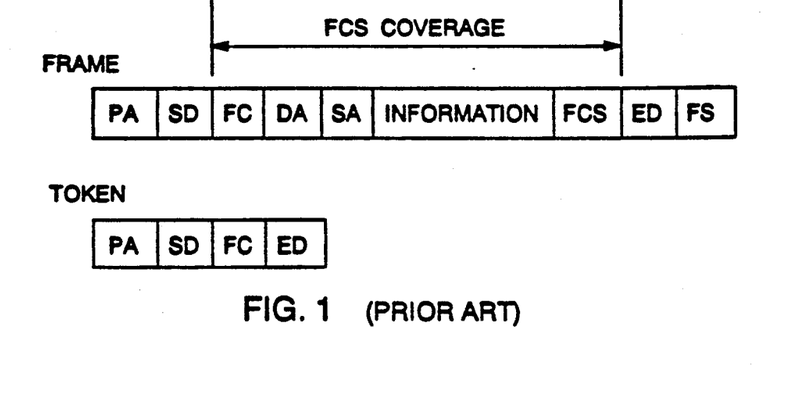
FIG. 1 is a schematic representation of the frame and token format established by the FDDI protocol.

Referring to FIG. 1, information is transmitted on an FDDI ring in frames that consist of a sequence of 5-bit characters or "symbols", each symbol representing 4 data bits. Information is typically transmitted in symbol pairs or "bytes". Tokens are used to signify the right to transmit data between stations.

FIG. 1 shows the fields which are used within the FDDI frame and token formats. A preamble field (PA), which consists of a sequence of IDLE line-state symbols, precedes every transmission. The IDLE symbols provide a maximum frequency signal which is used for receive clock synchronization. The Start Delimiter field (SD) consists of a two symbol start delimiter pair which is uniquely recognizable independent of symbol boundaries. As stated above, the Start Delimiter byte establishes the boundaries for the information that follows. The Frame Control field (FC) defines the type of frame being received and its characteristics; it distinguishes synchronous from asynchronous transmission, specifies the length of the address and identifies the type of frame. The Frame Control field uniquely distinguishes a token. The End Delimiter field (ED) consists of two end delimiter symbols and completes a token. The Destination Address (DA) and Source Address (SA) fields are the destination and source addresses of the transmitted frame. The Destination Address field and the Source Address field are both either two bytes long or six bytes long, as determined by the Frame Control field. The Destination Address may be either an individual address or a group address. The Frame Check Sequence field (FCS), which is four bytes long, is a cyclic redundancy check using the American National Standards Institute (ANSI) standard polynomial. The INFORMATION field, as is the case for all fields covered by the Frame Check Sequence field, consists only of data symbols. The End Delimiter field of a frame is one end delimiter symbol (T), which is followed by the Frame Status field (FS) which consists of three control indicator symbols which indicate whether the addressed station has recognized its address, whether the frame has been copied, or whether any station has detected an error in the frame. As shown in FIG. 1, the End Delimiter of a token consists of only a single pair of end delimiter symbols (TT). The "T" followed by three control indicators represents the minimum end delimiter required by the FDDI protocol for a non-token frame. The protocol allows for additional pairs of control symbols in the End Delimiter or an additional odd number of control symbols followed by one last "T" symbol. All conforming implementations must be able to process these extended end delimiters without truncating them. The end delimiter symbol "T" and the two control symbols "R" and "S" are uniquely encoded and distinguishable from either normal data or IDLE symbols.

Figure 2:
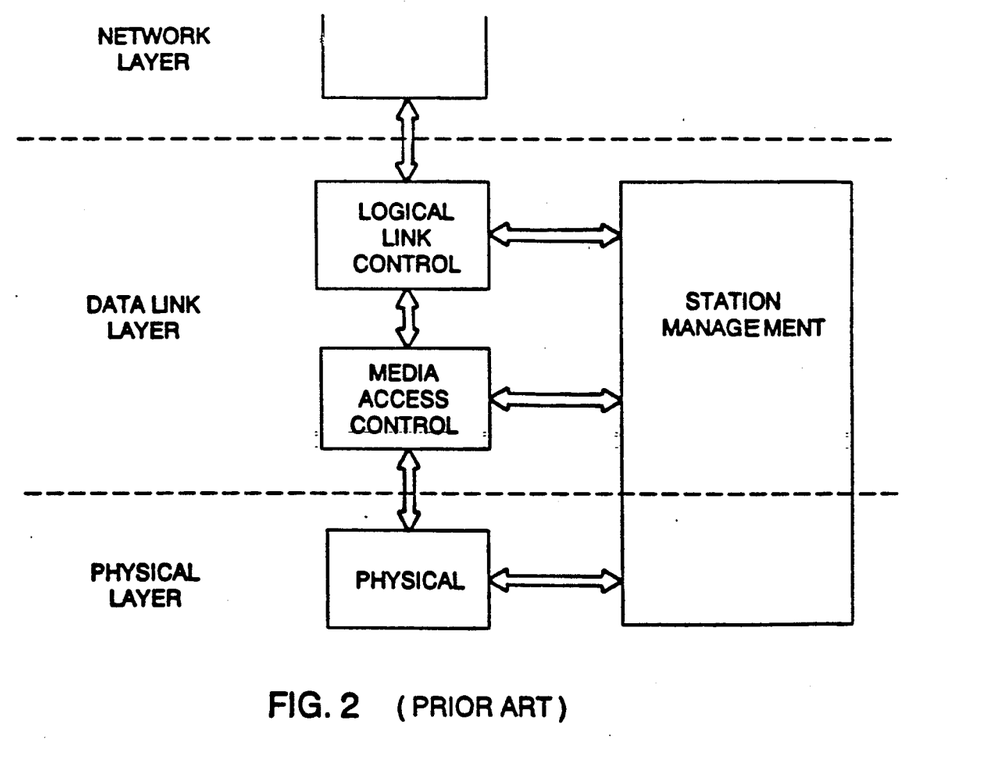
FIG. 2 is a block diagram illustrating the components required for a station in compliance with the FDDI protocol.

FIG. 2 shows the component entities necessary for a station to be in compliance with the FDDI protocol. The identified components include a Station Management function (SMT) which is a part of network management that resides in each station on the network to control the overall action of the station to ensure proper operation as a member of the ring. A Physical function (PHY) provides the hardware connection to adjacent stations in the network. A Media Access Control function (MAC) controls access to the transmission medium, transmitting frames to and receiving frames from the Media Access Control functions of other stations.

The Physical function provides the optical fiber hardware components that allow a link from one FDDI station to another ( It should be noted that a Physical Media Dependent portion of the FDDI protocol specifies the opto-mechanical hardware to be used for connection to adjacent nodes; the Physical function standard covers the area from optical characteristics through the symbol or byte wide interface with the MAC.). The Physical function simultaneously receives and transmits information. The Physical function's transmit logic accepts data from the Media Access Control function, converts this data to FDDI symbols and transmits the encoded data stream serially on the medium. The Physical function's receive logic receives the encoded serial data stream from the medium, establishes symbol boundaries based on the recognition of a start delimiter symbol pair and forwards decoded symbols to its associated Media Access Control function.

Additional information regarding the FDD protocol is presented by Floyd E. Ross, "FDDI—an Overview", Digest of Papers, Computer Soc. Intl. Conf., Compcon '87, pp. 434–444, which is hereby incorporated by reference to provide additional background information for the present invention.

The FDDI protocol provides that each Physical function component in an FDDI network include the capability for processing the transmitted symbol stream using a "smoothing function". For historical reasons, the Media Access Control standard does not require stations on the network to receive frames that are preceded by less than six IDLE symbol pairs. Thus, for performance reasons, the "smoothing function" has been added to the Physical function standard so that the Physical function attempts to send a minimum of seven IDLE pairs. This smoothing function is necessary to compensate for the possibility that the preamble of a transmitted frame may not be in compliance with the minimum desired preamble length of seven IDLE symbol pairs; that is, because of frequency variations between stations in the FDDI network, IDLE symbols may be deleted from a frame preamble as a result of multiple traversals of Physical functions in the network. Unconstrained preamble shrinkage can result in loss of frames. Thus, in an attempt to conserve preamble length, the smoothing function absorbs surplus symbols from longer preambles and redistributes them into shorter preambles. This significantly reduces the variance of preamble sizes during long burst transmissions and enhances the probability of an accurate transmission.

The FDDI protocol provides that the smoothing function be capable of "extending" preambles by inserting at least one additional IDLE symbol pair into preambles that are shorter than seven IDLE bytes (fourteen IDLE symbols) This extend capability is reclaimed by "contracting" or deleting excess IDLE symbols from preambles longer than seven IDLE bytes.

Figures 3, 4:
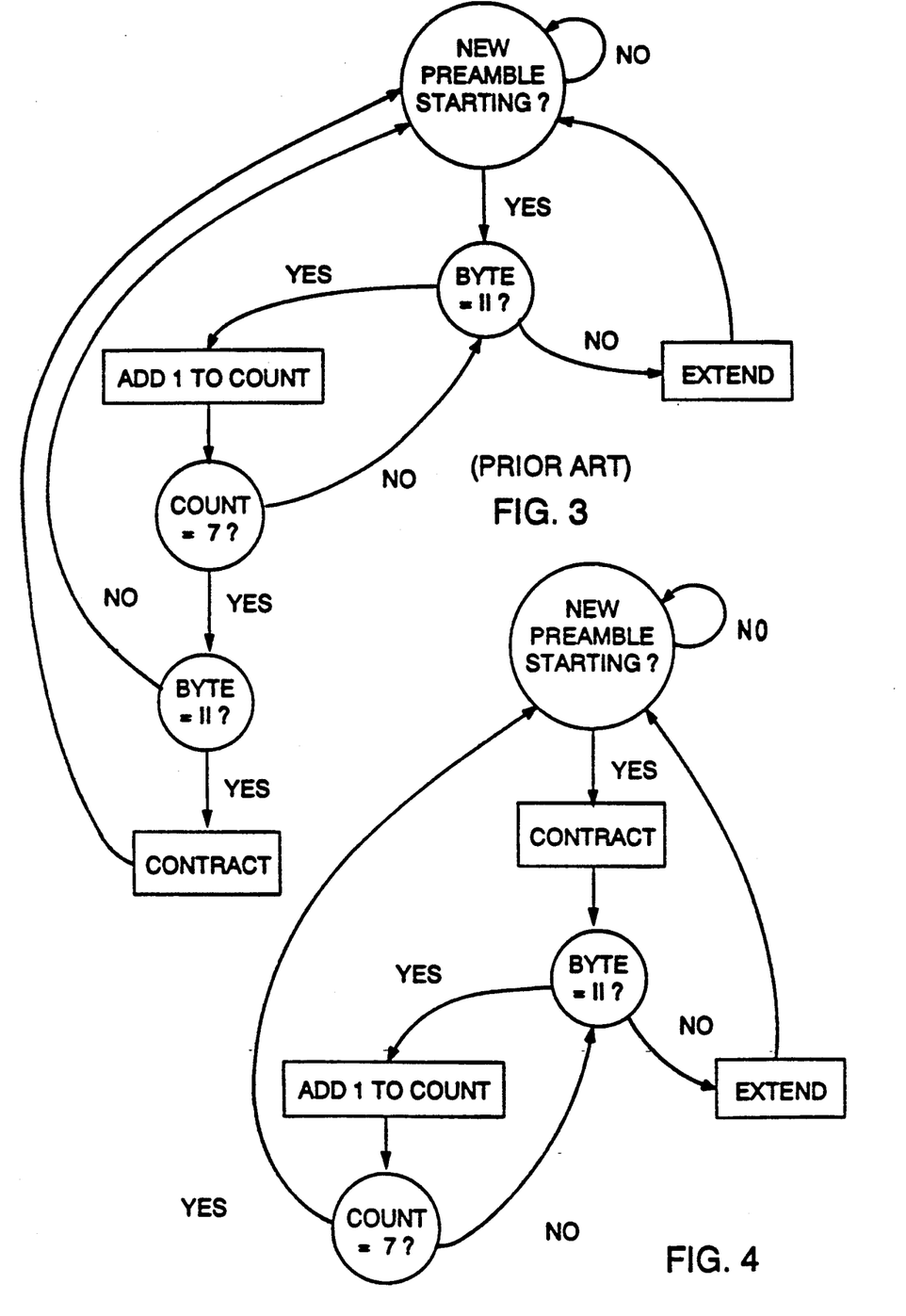
FIG. 3 is a flow chart illustrating a prior art smoothing filter technique.
FIG. 4 is a flow chart illustrating a smoothing filter in accordance with the present invention.

FIG. 3 provides a flow chart for one prior art approach to implementation of the FDDI smoothing filter "extend/contract" requirement. In accordance with the flow chart shown in FIG. 3, the smoothing filter first examines bytes to determine whether a new preamble is starting When an IDLE byte is identified, it is assumed to be the start of a new preamble If the smoothing filter identifies an IDLE byte, a counter is incremented. If the counter has not yet reached its preselected maximum (7 in the case of the FDDI protocol), then the next byte is examined to determine whether it is an IDLE byte. If it is not an IDLE byte, then the preamble is extended by inserting an IDLE byte and the smoothing filter begins searching for the beginning of a new preamble. If it is an IDLE byte, then the counter is again incremented. This iterative process continues until the counter reaches its threshold, signifying that a preamble consisting of an acceptable number of IDLE bytes (again, 7 in the case of the FDDI protocol) has traversed the smoothing filter. The next byte is then examined to determine whether it is an IDLE byte. If it is an IDLE byte, then the preamble is contacted to the acceptable number of IDLE bytes by removing an IDLE byte. The smoothing filter then begins searching for the start of a new preamble. If at any time after identification of the first IDLE byte, but before the counter reaches its threshold, the smoothing filter identifies a byte that is not an IDLE byte, then the smoothing filter extends the preamble by inserting an IDLE byte and begins searching for the start of the next preamble.

The above-described smoothing filter flow chart requires excessively complicated logic to implement the function.

SUMMARY OF THE INVENTION

The present invention provides a smoothing filter that may be used to accomplish preamble smoothing in a more efficient manner than has been previously known. In accordance with the present invention, the smoothing filter first identifies an IDLE byte, indicating the start of a new preamble. If an IDLE byte is identified and the smoothing filter is currently extended because the preamble of a previous frame included less than a preselected number of IDLE bytes, then the preamble is contracted by deleting the first IDLE byte or, if the frame prior to the initial IDLE byte was a frame fragment, then the information byte prior to the initial IDLE byte is deleted. Following contraction of the preamble, the next byte is examined to determine if it is an IDLE byte. If it is not an IDLE byte, then the preamble is extended by inserting an IDLE byte and the smoothing filter begins searching for the start of a new preamble. If it is an IDLE byte, then a counter is incremented. If the counter has not yet reached its preset threshold, then the next byte in the sequence is examined to determine whether it is an IDLE byte. If it is not an IDLE byte, then an IDLE byte is inserted to extend the preamble and the smoothing filter begins searching for the start of a new preamble. If it is an IDLE byte, then the counter is again incremented. This iterative process continues until the counter threshold has beer reached. At that point, the smoothing filter again begins searching for the start of a new preamble.

By contracting immediately upon the identification of the start of a new preamble if the last action by the smoothing filter has been an "extend", a smoothing filter in accordance with the present invention can be implemented by a logic configuration much less complicated than that provided in the past.

A better understanding of the features and advantages of the present invention may be obtained by reference to the following detailed description of the invention and accompanying drawings which set forth an illustrative embodiment in which the principles of the invention are utilized.

DETAILED DESCRIPTION OF THE INVENTION

FIG. 4 provides a flow chart illustrating the operation of an illustrative embodiment of a smoothing filter in accordance with the present invention. The smoothing filter examines information bytes to identify an IDLE byte, indicating the start of a preamble for a transmitted frame. If an IDLE byte is identified, and the smoothing filter is currently in an extended state because a previous preamble included less than seven IDLE bytes, then the preamble is contracted by deleting the first IDLE byte. Following this initial contraction of the preamble, the next byte is examined to determine if it is an IDLE byte. If it is not an IDLE byte, then the preamble is extended by inserting an IDLE byte and the smoothing filter begins searching for the start of a new preamble. If it is an IDLE byte, then a counter is incremented. If the counter has not yet reached its preset threshold, indicating that the seven IDLE byte preamble minimum required by the FDDI protocol has been reached, then the next byte in the sequence is examined to determine whether it is an IDLE byte. If it is not an IDLE byte, then an IDLE byte is inserted to extend the preamble. If it is an IDLE byte, then the counter is again incremented. This iterative process continues until the counter threshold has been reached. At that point, the smoothing filter again begins searching for the start of a new preamble.

Figure 5:
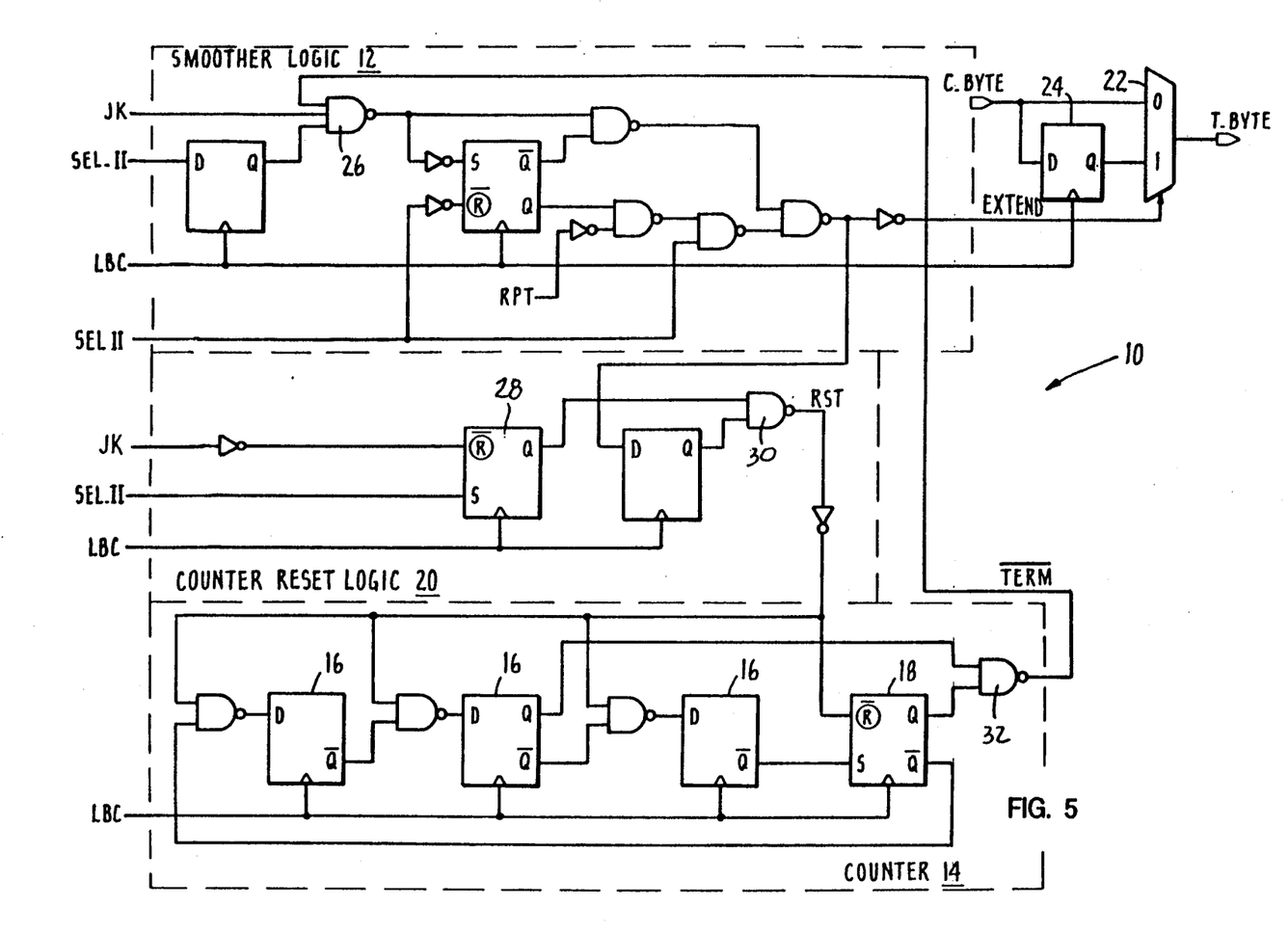
FIG. 5 is a logic diagram illustrating a logic implementation of the flow chart shown in FIG. 4.

FIG. 5 shows an illustrative logic embodiment of a smoothing filter 10 that implements the FIG. 4 flow chart.

The smoothing filter 10 shown in FIG. 5 attempts to maintain the number of IDLE bytes in the preamble field of a received FDDI data frame at a minimum of seven. When a preamble includes less than seven IDLE bytes, the smoothing filter 10 "extends" to insert an additional IDLE byte, enabling the smoothing filter 10 to contract if necessary in a future preamble. If the smoothing filter 10 has extended, then, upon identification of the next preamble, it contracts and remains contracted if it is able to transmit seven IDLE bytes; this enables the smoothing filter 10 to extend, if necessary, in a future preamble. Thus, the smoothing filter 10 may be said to have a smoothing capacity of one byte.

The smoothing filter 10 shown in FIG. 5 includes a smoother logic section 12 which, as explained in greater detail below, responds to predefined inputs to either extend or contract a received preamble.

A "sticky" Johnson counter 14 (i.e. a Johnson counter that has been modified to "stick" at its preset threshold), comprising a series of D-type flip-flops 16 and a set/reset flip-flop 18, keeps track of the number of consecutive IDLE bytes identified by the smoothing filter 10 after the start of a new preamble has been identified. Any sticky counter, including a sticky binary counter, or a nonsticky counter with appropriate external logic, may be utilized in practicing the present invention.

Counter reset logic 20 resets the counter 14 at the end of each pramble.

Multiplexor 22 responds to the EXTEND output from the smoother logic 12 to provide as its T.BYTE output either (1) the current byte (C.BYTE), if the EXTEND signal is in its inactive state; or
(2) the byte from the previous cycle of the byte clock LBC, which is stored in a register set comprising D-type flip-flop 24, if the EXTEND signal is in its active state.

A review of the smoother logic 12 shows that its output signal EXTEND will make the transition to active high only when the three inputs to NAND gate 26 are high. That is, smoothing filter 10 extends only when the following three conditions are met:

(1) the SELII signal was high in the previous cycle of the byte clock LBC, indicating that the previous cycle was an IDLE byte;
(2) the start delimiter signal JK is high, indicating the start of a frame; and
(3) the $\overline{\text{TERM}}$ signal is high, indicating that the counter 14 has not yet reached its threshold count, i.e. at least one but less than seven IDLE bytes have been identified prior to the start delimiter signal JK becoming active.

The RST output of counter reset logic 20 goes high allowing counter 14 to start counting IDLE bytes one clock cycle after the SELII input goes high. The RST output goes low to reset the counter 14 one clock cycle after the JK signal goes high.

The smoothing filter 10 contracts by deleting an IDLE pair or a symbol pair from the end of a frame fragment when one of the following conditions is met (Those familiar with the FDDI protocol will recognize that the protocol provides the criteria for identifying a frame fragment.):

(1) both the SELII and RPT signals are active, indicating a frame fragment; or
(2) the SELII signal is active for a second consecutive time.

RPT active indicates that reception is within the Frame Check Sequence (FCS) Coverage, that is, the start delimiter JK has been identified, but an end delimiter has not yet been identified. If SELII goes active within the Frame Check Sequence Coverage, then this is recognized as a frame fragment (a piece of a frame that is worthless). In this case, the byte just prior to the first IDLE byte is deleted (smoothing filter "contract"), which means that the smoothing filter 10 can extend when needed in the future.

The effective threshold of the smoothing filter 10 shown in FIG. 5 is seven, as provided by the FDDI protocol. This assumes that the SELII signal is true when the C.BYTE signal contains an IDLE pair. The threshold is established by the fact that the RS flip-flop 28 located between the SELII signal and the NAND gate 30 that creates the RST signal introduces one clock cycle of additional delay before allowing the counter 14 to step off its reset value. The sequence of events is as follows:

| C. BYTE | RST | COUNT | TERM |
|---------|-----|-------|------|
| TR      | 1   | 1110  | 0    |
| RR      | 1   | 1110  | 0    |
| II      | 1   | 1110  | 0    |
| II      | 0   | 1110  | 0    |
| II      | 0   | 0110  | 0    |
| II      | 0   | 0010  | 0    |
| II      | 0   | 0000  | 0    |
| II      | 0   | 0001  | 0    |
| II      | 0   | 1001  | 0    |
| XX      | 0   | 1101  | 1    |
| XX      | 0   | 1111  | 1    |
| XX      | 0   | 1111  | 1    |

Note that the TERM signal does not go true until after seven IDLE pairs have been processed. As a result, smoothing filter 10 extends on preambles comprising less than 14 IDLE symbols.

It should be understood that various alternatives to the embodiment of the invention described herein may be utilized in practicing the invention. It is intended that the following claims define the scope of the invention and that methods and apparatus within the scope of these claims and their equivalents be covered thereby.

What is claimed is:

1. In a data transmission network wherein an information frame is transmitted from a transmit station in the network to a receive station in the network, the information frame comprising a series of information characters including a sequence of a plurality of preamble information characters, a method of controlling the number of preamble information characters included in the transmitted sequence, the method comprising the sequential steps of:

(a) identifying an information character as an initial preamble information character;
(b) in the event that the preamble of a previous frame has been extended, deleting the initial preamble information character;

(c) in the event that the next information character is a preamble information character, incrementing a counter;

(d) iteratively repeating step (c) to identify a sequence of preamble information characters until the counter reaches a preset threshold, indicating that a continuous sequence of a preselected number of preamble information characters has been transmitted.

2. A method as in claim 1 wherein, in the event that the counter does not reach the preselected number, indicating that less than a continuous sequence of the preselected number of preamble information characters has been transmitted, inserting a preamble information character.

3. In a Fiber Distributed Data Interface network wherein information frames are transmitted from a transmit function to a receive function, the information frames comprising a series of information bytes including an initial preamble comprising a continuous sequence of a plurality of IDLE bytes, a method of expanding or contracting the transmitted preamble, the method comprising the sequential steps of:

(a) identifying an information byte as an initial IDLE byte, indicating the start of a new preamble;

(b) in the event that the preamble of a previous frame has been extended, contracting the new preamble by deleting the initial IDLE byte;

(c) when the next subsequent information byte is an IDLE byte, incrementing a counter;

(d) iteratively repeating step (c) to identify a sequence of IDLE bytes until the counter reaches a preset threshold, indicating that a continuous sequence of a preselected number of IDLE bytes has been transmitted.

4. A method as in claim 3 wherein, in the event that the counter does not reach the preset threshold, indicating that less than a continuous sequence of the preselected number of IDLE bytes has been transmitted, extending the transmitted preamble by inserting an IDLE byte.

5. In a data transmission network wherein an information frame is transmitted from a transmit station in the network to a receive station in the network, the information frame comprising a series of information characters including a sequence of a plurality of preamble information characters, apparatus for controlling the number of preamble information characters included in the transmitted sequence, the apparatus comprising:

(a) means for identifying an information character as an initial preamble information character;

(b) means for deleting the initial preamble information character when the preamble of a previous frame has been extended;

(c) means for examining the next subsequent information character to identify whether it is a preamble information character;

(d) a counter;

(e) means for incrementing the counter when the next subsequent received information character is a preamble information character; and (f) means for iteratively examining information characters to identify a sequence of preamble information characters until the counter reaches a preset threshold indicating that a continuous sequence of a preselected number of preamble information characters has been transmitted.

6. Apparatus as in claim 5 and further comprising means for inserting a preamble information character in the event that the counter does not reach the preset threshold, indicating that less than a continuous sequence of the preselected number of preamble information characters has been transmitted.

7. In a Fiber Distributed Data Interface network wherein information frames are transmitted from a transmit function to a receive function, the information frames comprising a series of information bytes including an initial preamble comprising a continuous sequence of a plurality of IDLE bytes, circuitry for expanding or contracting the transmitted preamble, the circuitry comprising:

(a) means for identifying a information byte as an initial IDLE byte, indicating the start of a new preamble;

(b) means for contracting the new preamble by deleting the initial IDLE byte when a preamble of the previous frame has been extended;

(c) means for examining the next subsequent information byte to identify whether it is an IDLE byte;

(d) a counter;

(e) means for incrementing the counter when the next subsequent information byte is an IDLE byte; and (f) means for iteratively examining information bytes to identify a sequence of IDLE bytes until the counter reaches a preset threshold indicating that a continuous sequence of a preselected number of IDLE bytes has been transmitted.

8. Circuitry as in claim 7 and further including means for extending the preamble by inserting an IDLE byte in the event that the counter does not reach the preset threshold indicating that less than a continuous sequence of the preselected number of IDLE bytes has been transmitted.

9. In a data transmission network wherein an information frame is transmitted from a transmit station in the network to a receive station in the network, the information frame comprising a series of information characters including a sequence of a plurality of preamble information characters, a method of controlling the number of preamble information characters included in the transmitted sequence, the method comprising the sequential steps of:

(a) identifying an information character as an initial preamble information character;

(b) in the event that the frame prior to the preamble information character was a frame fragment, deleting the information character preceding the initial preamble information character;

(c) when the next subsequent information character is a preamble information character, incrementing a counter;

(d) iteratively repeating step (c) to identify a sequence of preamble information characters until the counter reaches a preset threshold, indicating that a continuous sequence of a preselected number of preamble information characters has been transmitted.

10. A method as in claim 9 wherein, in the event that the counter does not reach the preselected number, indicating that less than a continuous sequence of the preselected number of information characters has been transmitted, inserting a preamble information character.

11. In a Fiber Distributed Data Interface network wherein information frames are transmitted from a transit function to a receive function, the information frames comprising a series of information bytes including an initial preamble comprising a continuous sequence of plurality of IDLE bytes, circuitry for expanding or contracting the transmitted preamble, the circuitry comprising:
  (a) a counter;
  (b) means for holding the counter reset while not identifying IDLE bytes;
  (c) means for releasing the counter upon identification of an initial IDLE byte;
  (d) means for determining whether the previous frame was a frame fragment;
  (e) means for deleting the initial IDLE byte in the event that the preamble of a previous frame has been extended and the previous frame was not a frame fragment;
  (f) means for deleting the last information character of the frame fragment in the event that the preamble of a previous frame has been extended and the previous frame was a frame fragment;
  (g) means for incrementing the counter of the next subsequent information character is an IDLE byte; and
  (h) means for iteratively examining information characters to identify a sequence of IDLE bytes until the counter reaches a preset threshold indicating that a continuous sequence of a preselected number of IDLE bytes has been transmitted.

12. Circuitry as in claim 11 and further including means for extending the preamble by inserting an IDLE byte in the event that the counter does not reach the preselected threshold, indicating that less than a continuous sequence of the preselected number of IDLE bytes has been transmitted.

13. In a data transmission network wherein an information frame is transmitted from a transmit station in the network to a receive station in the network, the information frame comprising a series of information characters including a sequence of a plurality of preamble information characters, apparatus for controlling the number of preamble information characters included in the transmitted sequence, the apparatus comprising:
  (a) means for identifying a information character as an initial preamble information character;
  (b) means for deleting the information character preceding the initial preamble iniormation character when the prior frame was a frame fragment;
  (c) means for examining the next subsequent information character to identify whether it is a preamble information character;
  (d) a counter;
  (e) means for incrementing the counter when the next subsequent information character is a preamble information character; and
  (f) means for iteratively examining information characters to identify a sequence of preamble information characters until the counter reaches a preset threshold indicating that a continuous sequence of a preselected number of preamble information characters has been transmitted.

14. Apparatus as in claim 13 and further comprising means for inserting a preamble information character in the event that the counter does not reach the preset threshold, indicating that less than a continuous sequence of the preselected number of preamble information characters has been transmitted.

15. In a Fiber Distributed Data Interface network wherein information frames are transmitted from a transmit function to a receive function, the information frames comprising a series of information bytes including an initial preamble comprising a continuous sequence of a plurality of IDLE bytes, circuitry for expanding or contracting the transmitted preamble, the circuitry comprising:
  (a) means for identifying an information byte as an initial IDLE byte, indicating the start of a new preamble;
  (b) means for deleting the information byte preceding the initial IDLE byte when the prior frame was a frame fragment;
  (d) means for examining the next subsequent information byte to identify whether it is an IDLE byte;
  (e) a counter;
  (f) means for incrementing the counter when the next subsequent information byte is an IDLE byte; and
  (g) means for iteratively examining information bytes to identify a sequence of IDLE bytes until the counter reaches a preset threshold indicating that a continuous sequence of a preselected number of IDLE bytes has been transmitted.

16. Circuitry as in claim 15 and further including means for extending the preamble by inserting an IDLE byte in the event that the counter does not reach the preset threshold, indicating that less than a continuous sequence of the preselected number of IDLE bytes has been transmitted.

17. In a data transmission network wherein information frames are transmitted from a transmit station in the network to a receive station in the network, an information comprising a series of information characters including a sequence of a plurality of preamble information characters, a method of controlling the number of preamble information characters included in the transmitted sequence, the method comprising the steps of:
  (a) holding a counter reset while not identifying preamble information characters;
  (b) releasing the counter upon identification of an initial preamble information character;
  (c) determining whether the previous frame was a frame fragment;
  (d) in the event that the preamble of a previous frame has been extended and the previous frame was not a frame fragment, deleting the initial preamble information character;
  (e) in the event that the preamble of a previous frame has been extended and the previous frame was a frame fragment, deleting the last information character of the frame fragment;
  (f) in the event that the next subsequent information character is a preamble information character, incrementing the counter;
  (g) iteratively repeating step (f) to identify a sequence of preamble information characters until the counter reaches a preset threshold, indicating that a continuous sequence of a preselected number of preamble information characters has been transmitted.

18. A method as in claim 17 wherein, in the event that the counter does not reach the preset threshold, indicating that less than a continuous sequence of the preselected number of information characters has been processed, inserting a preamble information character.

19. In a Fiber Distributed Data Interface network wherein information frames are transmitted from a transmit function to a receive function, an information frame comprising a series of information bytes including an initial preamble comprising a continuous sequence of a plurality of IDLE bytes, a method of expanding or contracting the transmitted preamble, the method comprising the steps of:

(a) holding a counter reset while not identifying IDLE bytes;

(b) releasing the counter upon identification of an initial IDLE byte;

(c) determining whether the previous frame was a frame fragment;

(d) in the event that the preamble of a previous frame has been extended and the previous frame was not a frame fragment, deleting the initial IDLE byte;

(e) in the event that the preamble of a previous frame has been extended and the previous frame was a frame fragment, deleting the last information character of the frame fragment;

(f) in the event that the next subsequent information character is an IDLE byte, incrementing the counter;

(g) iteratively repeating step (f) to identify a sequence of IDLE bytes until the counter reaches a preset threshold, indicating that a continuous sequence of a preselected number of IDLE bytes has been transmitted.

20. A method as in claim 19 wherein, in the event that the counter does not reach the preset threshold, indicating that less than a continuous sequence of the preselected number of IDLE bytes has been transmitted extending the preamble by inserting an IDLE byte.

21. In a data transmission network wherein an information frame is transmitted from a transmit station in the network to a receive station in the network, the information frame comprising a series of information characters including a sequence of a plurality of preamble information characters, apparatus for controlling the number of preamble information characters included in the transmitted sequence, the apparatus comprising:

(a) a counter;

(b) means for holding the counter reset while not identifying preamble information characters;

(c) means for releasing the counter upon identification of an initial preamble information character;

(d) means for determining whether the previous frame was a frame fragment;

(e) means for deleting the initial preamble information character in the event that the preamble of a previous frame has been extended and the previous frame was not a frame fragment;

(f) means for deleting the last information character of the frame fragment in the event that the preamble of a previous frame has been extended and the previous frame was a frame fragment;

(g) means for incrementing the counter when the next subsequent information character is a preamble information character; and (h) means for iteratively examining information characters to identify a sequence of preamble information characters until the counter reaches a preset threshold indicating that a continuous sequence of a preselected number of preamble information characters has been transmitted.

22. Apparatus as in claim 21 and further comprising means for inserting a preamble information character in the event that the counter does not reach the preset threshold, indicating that less than a continuous sequence of the preselected number of preamble information characters has been processed.

* * * * *

UNITED STATES PATENT AND TRADEMARK OFFICE
CERTIFICATE OF CORRECTION

PATENT NO. : 5,018,171

DATED : May 21, 1991

INVENTOR(S): Ronald S. Perloff, Timothy L. Garverick

It is certified that error appears in the above-identified patent and that said Letters Patent is hereby corrected as shown below:

Col. 7, lines 1-3, claim 1(c) should read
   --1(c). in the event that the next subsequent information character is a preamble information character, incrementing a counter;--

Col. 8, lines 48-49 before "was" claim 9(b) should read
   --9(b). in the event that the frame prior to the initial preamble information character--.

Col. 10, line 66, claim 18, should read
         delete "processed" and substitute --transmitted--.

Col. 12, line 35, claim 22, should read
         delete "processed" and substitute --transmitted--.

UNITED STATES PATENT AND TRADEMARK OFFICE
CERTIFICATE OF CORRECTION

PATENT NO. : 5,018,171

DATED : May 21, 1991

INVENTOR(S) : Ronald S. Perloff, Timothy L. Garverick

It is certified that error appears in the above-identified patent and that said Letters Patent is hereby corrected as shown below:

In Col. 10, correct claim 15 as follows:
    line 15, delete "(d)" and substitute —(c)—.
    line 17, delete "(e)" and substitute —(d)—.
    line 18, delete "(f)" and substitute —(e)—.
    line 20, delete "(g)" and substitute —(f)—.

Signed and Sealed this

Thirtieth Day of March, 1993

*Attest:*

STEPHEN G. KUNIN

*Attesting Officer*      *Acting Commissioner of Patents and Trademarks*